B. THOENS.
REFRIGERATING APPARATUS.
APPLICATION FILED OCT. 17, 1913.
1,180,207.
Patented Apr. 18, 1916.
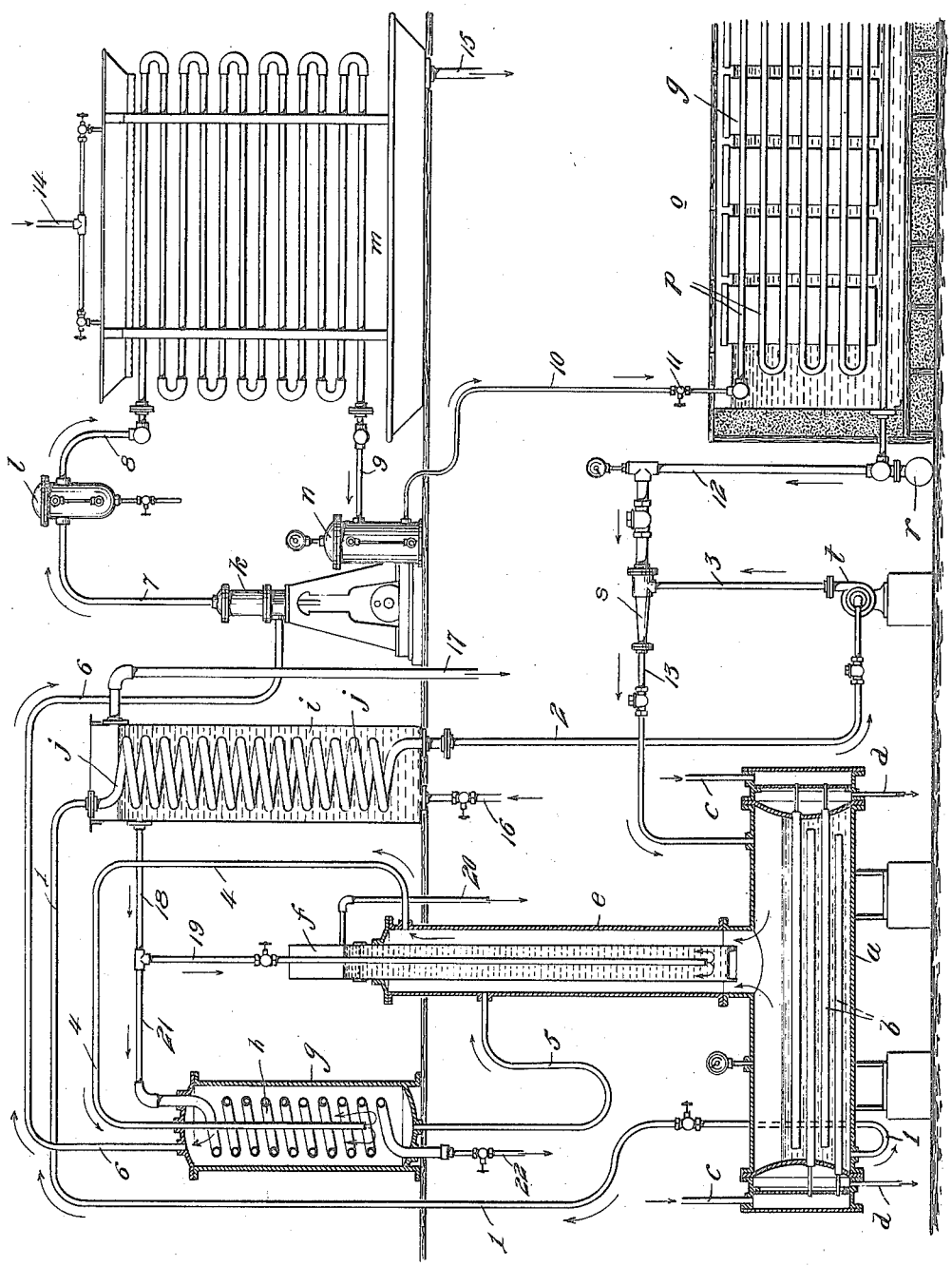
WITNESSES:
INVENTOR
Burchard Thoens
BY
Foster Freeman Watson + Cort
ATTORNEYS

UNITED STATES PATENT OFFICE.

BURCHARD THOENS, OF NEW YORK, N. Y.

REFRIGERATING APPARATUS.

1,180,207.  Specification of Letters Patent.  Patented Apr. 18, 1916.

Application filed October 17, 1913. Serial No. 795,728.

*To all whom it may concern:*

Be it known that I, BURCHARD THOENS, a subject of the Emperor of Germany, residing at New York, county of New York, State of New York, have invented certain new and useful Improvements in Refrigerating Apparatus, of which the following is a specification.

The present invention relates to improvements in refrigerating apparatus and the object of the invention is to provide such apparatus which will combine features of both the "absorption" and the "compression" systems of refrigeration.

By the present invention it is possible to provide a refrigerating apparatus which will be more efficient and operate under more nearly theoretically correct conditions than are attained by apparatus as commonly constructed under either of the above stated systems.

The accompanying drawing illustrates, more or less diagrammatically, an apparatus constructed in accordance with the present invention.

Referring to the drawings $a$ designates a vapor generator which may be of any suitable type or form. As shown, steam is supplied to chambers at the end of generator $a$ by pipes $c$ and heating pipes $b$ communicate with said chambers. Water of condensation is withdrawn from the generator through pipes $d$. The steam supplied through the pipes $c$ may be the exhaust from the engine pipes $c$ of the compressor and pump hereinafter referred to, or other steam driven member of the apparatus.

As shown the generator $a$ is provided with an upwardly projecting column or stand pipe $e$ into which the ascending vapors pass and within which is arranged a tank or vessel $f$ for water so that the vapors will be initially cooled in passing through the stand pipe. By a pipe 4 vapor is conducted from the stand pipe $e$ to a gas cooler $g$ within which is arranged a cooling coil $h$ having its inlet or supply pipe 21 extending through the top of the cooler and its waste or discharge pipe 22 passing through the bottom thereof. The lower end of the cooler $g$ is connected, by a pipe 5, with the stand pipe $e$ for the purpose of returning to the latter any condensation collecting in the cooler $g$.

The cooler $g$ is connected by a pipe 6 with the inlet of a gas compressor $k$, the outlet of which is through pipes 7, 8 connected with a condenser $m$. Preferably there is an oil separator $l$ introduced into this connection between the outlet from the gas compressor and the condenser $m$. The outlet of the condensing coil $m$ is connected through a pipe 9 with a liquid receiver $n$, which in turn, through pipe 10 provided with an expansion valve 11, is connected with the inlet end of a refrigerating coil $p$. As shown this coil is arranged within a tank $o$ containing brine and in which are supported freezing cans $q$. The outlet of the refrigerating coil $p$ is connected through a pipe 12 with an injector absorber $s$, a suitable oil trap $r$ being provided at the lower end of said pipe.

A pump $t$ is provided for circulating liquid from the generator $a$ through the injector absorber $s$ and back to the vapor generator. As shown this liquid circulating system includes three pipes or conduits 1, 2 and 3, a coil $j$ connecting the pipes 1 and 2 and being arranged within a tank $i$ to which water is supplied for cooling the liquid passing through the coil. Said cooling water is supplied to the tank $i$ through a supply pipe 16, and by means of a branch pipe 18 the tank $i$ is connected with the inlet 21 to the gas cooling coil $h$, and by a lateral pipe 19 with the vessel or receptacle $f$ within the vapor generator stand pipe $e$. A waste or overflow pipe 17 conducts surplus water away from the cooling tank $i$. Cooling water is supplied to the condenser $m$ through a suitable pipe 14 and the usual waste outlet 15 is provided below said condenser.

The operation of the apparatus will be readily understood from the drawing in connection with the foregoing description.

The vapors rising from the aqua ammonia solution in the generator $a$ pass through the standpipe $e$, being preliminarily cooled by the water in the receptacle $f$ therein, and into the cooler $g$ where their temperature is further reduced by the action of the cooling coil $h$. By this cooling the vapor or gas is deprived of any moisture or steam initially present in it, such moisture being returned to the generator through the pipe 5. The anhydrous gas passes through the pipe 6 to the compressor $k$ by which it is forced into the condenser $m$, passing first through the oil separator $l$. From the condenser the liquefied gas passes through the liquid receiver $n$ and pipe 10 to the refrigerating coil wherein it expands cooling the brine in the tank $o$. If desired, the cooled brine can be caused to circulate through refrigeration pipes instead of being employed, as shown, to freeze the contents of cans $q$. From the outlet of the coil $p$ the gas passes through pipe 12 to the absorber $s$, any oil contained therein being deposited in the trap $r$. The weak solution remaining in the generator $a$ is caused by action of the pump $t$ to circulate through pipes 1, 2 and 3, being cooled in its passage from the coil $j$, and is discharged into the absorber $s$ from which the liquid and gas combined are returned to the generator $a$ through a pipe 13. In the absorber $s$ the gas coming from the refrigerating coil $p$ comes into contact with the cooled weak liquid and is instantly absorbed thereby and returned therewith to the generator $a$. If desired, an exchanger of well-known form for exchanging the temperature of the liquid forced by the pump into the generator with the temperature of the liquid passing from the generator to the liquid cooling coil $j$ may be interposed between the absorber $s$ and generator $a$. Such an arrangement would effect a saving of cooling water in the tank $i$ and steam required to vaporize the solution in the generator $a$.

Among the advantages of an apparatus constructed as hereinbefore described, the following may be noted. Liquid will be maintained at substantially a constant level in the generator $a$, the pump $t$ merely circulating the weak liquid through the generator and therefore regulating means such as are commonly required in refrigerating machines working on the absorption principle may be dispensed with. By combining the gas passing from the refrigerating coil with the weak liquid in the injector absorber and forcing them both together into the generator without cooling, the heat of absorption is retained in the system, thereby effecting a saving of steam over that possible with machines as commonly constructed. Further, the present arrangement avoids the necessity for providing a special supply of water for cooling the absorbers commonly employed. Less steam and water being required for the operation of the improved apparatus than with machines heretofore employed a smaller boiler plant and cooling water pump are necessary and thereby a further saving in steam consumption is effected. The suction pressure of the compressor is raised by the exhaust steam of the compressor engine, giving the compressor a larger capacity or permitting the use of a smaller compressor for a given capacity, requiring less steam for its operation, and, as the heat of compression is less, less superheating of the gas takes place during compression thereby obviating a loss in efficiency due to superheating.

Having thus described the invention what is claimed as new and desired to be secured by Letters Patent is:

1. In a combined compression and absorption refrigerating apparatus, the combination of a vapor generator, a gas cooler connected with the generator, a compressor, connections between the gas cooler and the suction side of the compressor, a condenser, connections between the discharge side of the compressor and the condenser, a refrigerator connected with the condenser, an absorber connected with the outlet from the refrigerator, a weak liquor cooler, connections between said weak liquor cooler and the vapor generator, a pump having its suction side connected with the weak liquor cooler and its discharge side connected with the absorber, and a connection between the absorber and vapor generator.

2. In a refrigerating apparatus, the combination of a vapor generator, a gas compressor having its inlet connected with the vapor generator, a refrigerating coil, connections between the inlet of the refrigerating coil and the compressor, an injector absorber, a pump arranged between the vapor generator and absorber for circulating liquid from the vapor generator through said absorber, and a connection from the outlet of the refrigerating coil to said absorber.

3. In a refrigerating apparatus, the combination of a vapor generator, a gas compressor having its inlet connected with the vapor generator, a refrigerating coil, connections between the inlet of the refrigerating coil and the compressor, means for cooling the gas supplied to the compressor by the vapor generator, an injector absorber, a pump for circulating liquid from the vapor generator through said absorber, and a connection independent of said pump and its connection with the absorber between the outlet of the refrigerating coil and said absorber.

4. In a refrigerating apparatus, the combination of a vapor generator, a gas compressor, an injector absorber, means for circulating liquid from the generator through said absorber, means for cooling said liquid before it enters the absorber, means interposed between the vapor generator and gas compressor for cooling the vapor, a refrigerating coil having its outlet connected with the vapor absorber, independent of the means for circulating liquid through the absorber, and connections between the compressor and the inlet of the refrigerating coil.

5. In a refrigerating apparatus, the combination of a vapor generator, a pump connected with the liquid chamber of the vapor generator, an injector absorber interposed between and connected with the pump outlet and the vapor generator, a gas compressor having its inlet connected with the vapor generator, means for cooling vapor supplied to the compressor, means for cooling the liquid circulated by said pump, a refrigerating coil having its outlet connected with the absorber, and connections between the compressor and the inlet of the refrigerating coil.

6. In a refrigerating apparatus, the combination of a vapor generator having a stand pipe adapted to receive vapor rising therefrom and provided with means for cooling vapor passing therethrough, a gas compressor having its inlet connected with said stand pipe, a pump having its inlet connected with the liquid chamber of the vapor generator, an injector absorber connected with the outlet of the pump and with the vapor generator, means for cooling liquid in passing from the vapor generator to the pump, a refrigerating coil having its outlet connected with the absorber, and connections between the compressor and the inlet of the refrigerating coil.

7. In a refrigerating apparatus, the combination of a vapor generator, a gas compressor having its inlet connected with the vapor generator, a refrigerating coil, connections between the inlet of the refrigerating coil and the compressor, an absorber connected with an outlet of the refrigerating coil and with the vapor generator, connections between the vapor generator and the absorber independent of the refrigerating coil, and means in the last said connections for circulating weak liquor from the generator through the absorber.

8. In a refrigerating apparatus, the combination of a vapor generator, a gas compressor having its inlet connected with the vapor generator, a refrigerating coil, connections between the inlet of the refrigerating coil and the compressor, an absorber connected with the outlet of the refrigerating coil and with the vapor generator, a pump between the vapor generator and the connection of the refrigerating coil with the absorber for forcing weak liquid from the generator to and through the absorber, and means for cooling said weak liquid before admitting it to the absorber.

9. In a refrigerating apparatus, the combination with a vapor generator and a refrigerator, of an absorber connected with the outlet from the refrigerator, a pump, a weak liquor cooler connected with the vapor generator and with the suction side of the pump, connections between the discharge side of the pump and the absorber, and connections between the absorber and the vapor generator.

In testimony whereof I affix my signature in presence of two witnesses.

BURCHARD THOENS.

Witnesses:
　ISABEL LEVINSON,
　FRIEDA KICK.